(12) United States Patent
Chraplyvy et al.

(10) Patent No.: US 6,473,212 B1
(45) Date of Patent: Oct. 29, 2002

(54) LIGHTWAVE COMMUNICATION SYSTEMS USING SEMICONDUCTOR OPTICAL AMPLIFIERS

(75) Inventors: Andrew Roman Chraplyvy, Matawan; Robert Meachem Jopson, Rumson; Atul Kumar Srivastava, Eatontown; James William Sulhoff, Ocean; Yan Sun, Middletown, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/253,259

(22) Filed: Feb. 19, 1999

(51) Int. Cl.[7] .......................... H04J 14/02; H04B 10/06; H04B 10/16; H04B 10/18

(52) U.S. Cl. ....................... 359/124; 359/124; 359/161; 359/179; 359/189

(58) Field of Search ................................. 359/110, 124, 359/161, 179, 189

(56) References Cited

U.S. PATENT DOCUMENTS 5,017,885 A  5/1991  Saleh ...................... 330/4.3

OTHER PUBLICATIONS

Kyo Inoue, "Crosstalk and Its Power Penalty in Multichannel Transmission due to Gain Saturation in a Semiconductor Laser Amplifier", Journal of Lightwave Technology, vol. 7, No. 7, (Jul. 1989), pp. 1118–1123.
Adel A. M. Saleh et al., "Effects of Semiconductor–Optical–Amplifier Nonlinearity on the Performance of High–Speed Intensity–Modulation Lightwave Systems", IEEE Transactions on Communications, vol. 38, No. 6, (Jun. 1990), pp. 839–846.

J. C. Simon et al., "Travelling wave semiconductor optical amplifier with reduced nonlinear distortions", Electronics Letters, vol. 30, No. 1, (Jan. 6, 1994), pp. 49–50.

L. F. Tiemeijer et al., "Reduced Intermodulation Distortion in 1300 nm Gain–Clamped MQW Laser Amplifiers", IEEE Photonics Technology Letters, vol. 7, No. 3, (Mar. 1995), pp. 284–286.

(List continued on next page.)

*Primary Examiner*—Leslie Pascal
(74) *Attorney, Agent, or Firm*—Gregory J. Murgia (57) ABSTRACT

Substantially error-free communications is achieved in an optical communication system that includes optical amplifiers by detecting bits transmitted in the amplified optical signal using a detection threshold that is derived as a function of a maximum power level associated with a first bit value, e.g., bit "0", and a minimum power level associated with a second bit value, e.g., bit "1". Importantly, this detection scheme can be used to accurately detect bit patterns in the amplified signal even in the presence of nonlinear distortions caused by gain variations, such as intermodal distortion and saturation induced crosstalk. In a wavelength division multiplexed (WDM) system comprising semiconductor optical amplifiers, for example, the detection threshold can be set at a level corresponding to $P_{TOTAL}/2N$, where $P_{TOTAL}$ represents the total power in the WDM signal and N represents the number of optical channels in the WDM signal. According to another aspect of the invention, the effect of gain fluctuations becomes smaller as the number of channels increase. In particular, a smoothing effect is realized for the total effective saturation power as gain variations decrease as a function of an increase in the number of channels. As such, the performance of a semiconductor optical amplifier according to the principles of the invention approaches the linear performance of fiber amplifiers as the number of channels increases.

10 Claims, 7 Drawing Sheets

OTHER PUBLICATIONS

C. R. Doerr et al., "Elimination of Signal Distortion and Crosstalk from Carrier Density Changes in the Shared Semiconductor Amplifier of Multifrequency Signal Sources", IEEE Photonics Technology Letters, vol. 7, No. 10, (Oct. 1995), pp. 1131–1133.

P. Doussiere, et al., "Clamped Gain Travelling Wave Semiconductor Optical Amplifier for Wavelength Division Multiplexing Applications", 14th International Semiconductor Laser Conference, (Sep. 19–23, 1994), pp. 185–186.

Keang–Po Ho et al., "Reduction of semiconductor laser amplifier induced distortion and crosstalk for WDM systems using light injection", Electronics Letters, vol. 32, No. 24, (Nov. 21, 1996), pp. 2210–2211.

G. Grosskopf et al., "Crosstalk in Optical Amplifiers for Two–Channel Transmission", Electronics Letters, vol. 22, No. 17, (Aug. 14, 1986), pp. 900–901.

Senfar Wen, "Crosstalk of two–channel wavelength conversion using semiconductor nonlinearity", Optics Communications, 135 (Feb. 15, 1997), pp. 285–288.

FIG. 1

$P_{IN}$ = 2dBm
RATE = 1.25 Gb/s

FIG. 2

$P_{IN}$ = 2dBm
RATE = 2.5 Gb/s

LIGHTWAVE COMMUNICATION SYSTEMS USING SEMICONDUCTOR OPTICAL AMPLIFIERS

FIELD OF THE INVENTION

The invention relates generally to semiconductor optical amplifiers and, more particularly, to lightwave systems and networks utilizing such amplifiers.

BACKGROUND OF THE INVENTION

Optical amplifiers are commonly used in lightwave communication systems as in-line amplifiers for boosting signal levels to compensate for losses in a transmission path, as power amplifiers for increasing transmitter power, and as pre-amplifiers for boosting signal levels before receivers. In wavelength division multiplexed (WDM) systems, which combine many optical channels at different wavelengths for transmission as a composite signal in an optical fiber, optical amplifiers are particularly useful because of their ability to amplify all channels simultaneously.

Erbium-doped fiber amplifiers are predominantly used in current WDM communication systems because of their gain characteristics and ease of coupling with optical fiber. Erbium-doped fiber amplifiers are particularly desirable for intensity modulated digital optical communication systems, wherein the light intensity of signal channels is modulated to represent the "1"s and "0"s of digital data. In particular, slow gain dynamics allow erbium-doped fiber amplifiers to provide constant gain to all signal channels in a WDM system regardless of bit transitions in the intensity modulated bit patterns. However, despite their usefulness in long haul transmission applications, the disadvantages of erbium-doped fiber amplifiers are well known. For example, erbium-doped fiber amplifiers are expensive and, as a result, do not provide the most cost effective solution for applications such as metropolitan optical networking and the like. Moreover, erbium-doped fiber amplifiers have a relatively narrow usable gain bandwidth which will become more of a problem in emerging long haul systems which have higher channel counts and which will use new optical fiber having a wider usable bandwidth.

By contrast, semiconductor optical amplifiers are comparatively inexpensive, have a large gain bandwidth, and can be easily integrated with other devices. However, semiconductor optical amplifiers have several limitations which have limited their use in optical communication systems to date. In particular, the fast gain dynamics and nonlinear gain characteristics of semiconductor optical amplifiers can be problematic. For example, gain changes quickly as input power changes and is not constant for the modulation speed of current communication systems, thus resulting in problems such as inter-modal distortion and saturation induced crosstalk, i.e., cross-saturation.

Briefly, cross-saturation results when intensity modulation in one channel leads to modulation of the gain available for other channels. For example, the gain of a specific channel is saturated not only by its own power, but also by the power of the other channels in the system. Cross-saturation is particularly problematic in intensity modulated systems because the channel power changes with time depending on the bit pattern. The signal gain of one channel then changes from bit to bit, and the change depends on the bit patterns of the other channels. Such gain fluctuations can result in detection errors which degrade overall bit error rate performance. Cross-saturation can be avoided by operating in the small signal region, i.e., unsaturated region. However, this solution is not practical for WDM systems which traditionally operate in the saturation region because of pumping efficiencies and other system considerations, e.g., high saturated power needed for wide dynamic range and high signal to noise ratios.

For more information on nonlinear distortion effects in semiconductor optical amplifiers, see, e.g., Inoue, *"Crosstalk and Its Power Penalty in Multichannel Transmission due to Gain Saturation in a Semiconductor Laser Amplifier"*, Journal of Lightwave Technology, vol. 7, no. 7, July 1989; Saleh et al., *"Effects of Semiconductor-Optical-Amplifier Nonlinearity on the Performance of High-Speed Intensity-Modulation Lightwave Systems"*, EEE Transactions on Communications, vol. 38, no. 6, June 1990; Simon et al., *"Travelling Wave Semiconductor Optical Amplifier with Reduced Nonlinear Distortions"*, Electronics Letters, vol. 30, no. 1, January 1994; and Tiemeijer et al., *"Reduced Intermodulation Distortion in 1300 nm Gain-Clamped MQW Layer Amplifiers"*, IEEE Photonics Technology Letters, vol. 7, no. 3, March 1995, all of which are herein incorporated by reference in their entirety.

To date, most attempts at solving the aforementioned problems have been limited to device-oriented solutions and have been predominantly directed towards problems for the small-signal model, i.e., transmissions in the small-signal gain region. Consequently, these approaches have not been particularly useful for WDM systems and the like.

SUMMARY OF THE INVENTION

Substantially error-free communications is achieved in an optical communication system comprising optical amplifiers according to the principles of the invention by detecting bits transmitted in the amplified optical signal according to a detection threshold that is derived as a function of a maximum power level associated with a first bit value, e.g., bit "0", and a minimum power level associated with a second bit value, e.g., bit "1". Importantly, this detection scheme can be used to accurately detect the bit patterns in the amplified signal even in the presence of nonlinear distortions such as inter-modal distortion and saturation induced crosstalk. In particular, accurate detection of individual bits in each of the channels is possible even with the nonlinear distribution of power in each of the channels resulting from gain variations caused by the nonlinear distortions.

According to one illustrative embodiment of the invention for use in a wavelength division multiplexed (WDM) system comprising semiconductor optical amplifiers, the detection threshold is set at a level corresponding to $P_{TOTAL}/2N$, where $P_{TOTAL}$ represents the total power in the WDM signal and N represents the number of optical channels in the WDM signal.

According to another aspect of the invention, we have discovered that the effect of gain variations becomes smaller as the number of optical channels within the wavelength division multiplexed signal increases. In particular, a smoothing effect is realized for the total effective saturation power as gain variations decrease as a function of an increase in the number of channels. As such, the performance of a semiconductor optical amplifier according to the principles of the invention approaches the linear performance of fiber amplifiers as the number of channels increases.

A system operated according to the principles of the invention therefore includes all the benefits of semiconductor optical amplifiers, e.g., lower cost and large gain bandwidth, while avoiding the problems associated with nonlinear performance of semiconductor optical amplifiers and without requiring significant device changes as suggested by the prior art. Consequently, such a solution can be readily implemented and advantageously used, especially in metropolitan area optical networking applications where cost is a primary consideration.

BRIEF DESCRIPTION OF THE DRAWING

A more complete understanding of the present invention may be obtained from consideration of the following detailed. description of the invention in conjunction with the drawing in which.

DETAILED DESCRIPTION OF THE INVENTION

Although the illustrative embodiments described herein are particularly well-suited for use in a wavelength division multiplexed system (WDM) comprising semiconductor optical amplifiers, and shall be described in this exemplary context, those skilled in the art will understand from the teachings herein that the principles of the invention may also be employed in conjunction with other types of optical communication systems and other types of optical amplifiers. For example, the principles of the invention can be applied to single channel optical communication systems and also to systems comprising other types of optical amplifiers having gain dynamics that give rise to the aforementioned problems. Furthermore, although the illustrative embodiments of the invention are described with reference to digital communications in which data is transmitted using bits "0" and "1", it will be appreciated that the inventive aspects are also applicable to other coding and modulation schemes. Accordingly, the embodiments shown and described herein are only meant to be illustrative and not limiting.

A brief review of gain-related problems in WDM systems is provided as a basis for understanding the principles of the invention. As is well known, optical amplifiers used for in-line amplification in WDM systems typically operate in the saturation region due to pumping efficiency and system considerations. In the saturation region, the output power of the amplifier is substantially fixed for a certain range of input power variations. As a result, the gain of the amplifier does not remain constant with the changes in input power. The output power of the amplifier must also be sufficiently high so that the signal to noise ratio at the receiver is high enough to permit accurate detection of the bit patterns transmitted in the intensity modulated signal.

Figure 1:
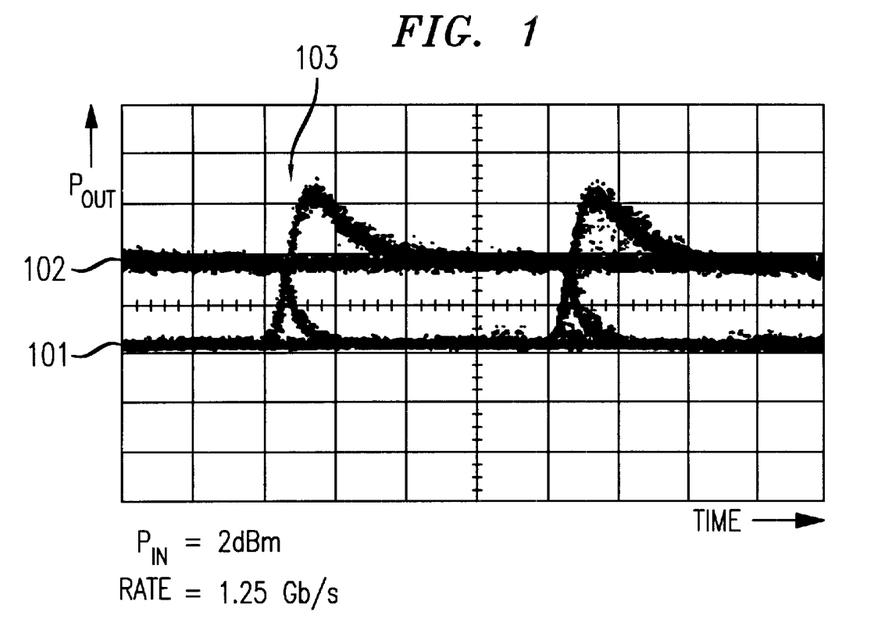
FIGS. 1 and 2 are graphical plots in the form of eye diagrams showing the effects of intermodal distortion and cross-saturation, respectively, in a semiconductor optical amplifier-based system.

As noted previously, the inherent nonlinearity of semiconductor optical amplifiers can potentially degrade system performance. In particular, the nonlinear characteristics of semiconductor optical amplifiers gives rise to two very important and potentially harmful effects, inter-modal distortion and saturation induced crosstalk, i.e., cross-saturation. FIG. 1 is an eye diagram of a signal channel wherein the output power, POUT, exhibits inter-modal distortion. More specifically, power level 101 represents a steady state power level for a "0" bit and power level 102 represents a steady state power level of a "1" bit in the channel. When a transition from a "0" to "1" occurs in the transmitted bit pattern, represented here as transition point 103, the power level of the "1" bit actually exceeds the steady state value 102 for a certain period of time, thus resulting in gain fluctuations in the amplified signal. Consequently, this type of nonlinear distortion, which is dependent on the intensity modulation within the signal channel, can cause problems in the detection of bits, thus degrading the overall bit error rate performance of the system.

Figure 2:
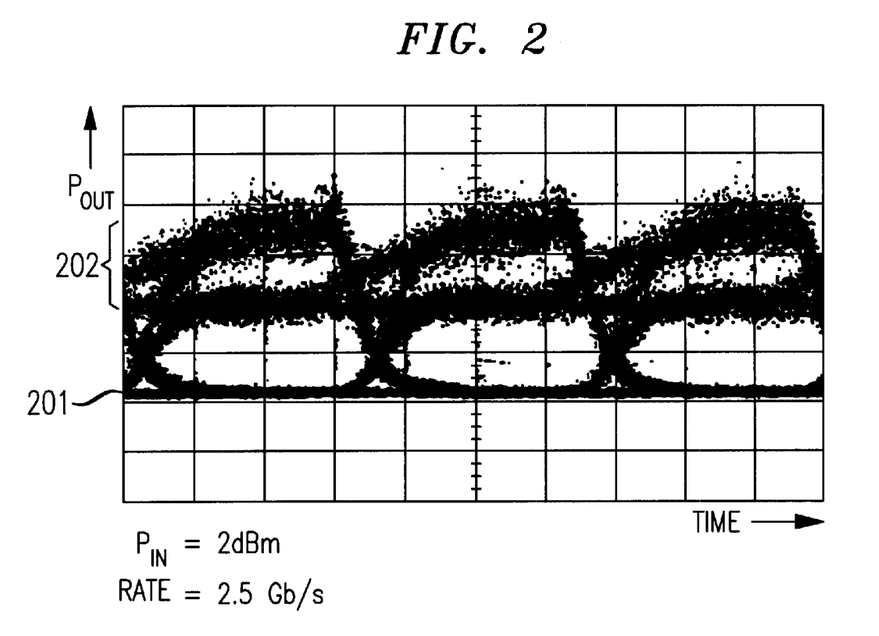

FIG. 2 is an eye diagram for one of the signal channels in a 2-channel system. It should be noted that a 2-channel system is shown for simplicity of illustration only. In this example, the output power $P_{OUT}$ in a signal channel depends on the state of the other channels through cross-saturation, which is the so-called crosstalk effect in WDM systems. In particular, the output power $P_{OUT}$ in one signal channel is affected by intensity modulation in the other channel in the system and will vary at random since each channel is independently modulated. As shown, power level 201 represents a power level for a "0" bit and power level 202 represents a range of power levels for a "1" bit in the channel. In particular, the power level of a "I" bit in the channel will vary according to the power level in the other channel of the system.

For example, if the other channel is transmitting a "0" bit, then the power level of a bit "1" in the channel shown in FIG. 2 will be at the higher end of range 202 since it will have substantially all of the total power in the system. Similarly, if the other channel is transmitting a "1" bit, then the power level of a bit "1" in the channel shown in FIG. 2 will be at the lower end of range 202 since the total power in the system will be shared between each of the channels. In sum, because the signal output for one channel fluctuates according to signal gain fluctuation induced by modulation in the other channels, this type of nonlinear distortion can cause problems in the detection of bits, thus degrading the overall bit error rate performance of the system.

In each of the foregoing examples, an input power of 2 dBm was used. Furthermore, a channel rate of 1.25 Gb/s was used in the example shown in FIG. 1 while a channel rate of 2.5 Gb/s was used in the example shown in FIG. 2. These parameters are meant to be illustrative only.

In systems employing erbium-doped fiber amplifiers, slow gain dynamics of the erbium-doped fiber amplifiers provide an advantage for modulation speeds of interest because the amplifier does not "respond" to the transitions in bits of "1"s and "0"s in the optical channels. Consequently, the erbium-doped fiber amplifier only sees the average power and therefore provides constant gain to the signal channels. As such, the gain of an erbium-doped fiber amplifier exhibits a linear characteristic such that inter-modal distortion and cross-saturation are not significant problems.

By contrast, the gain dynamics of a semiconductor optical amplifier are much faster than that of an erbium-doped fiber amplifier. In particular, the gain of a semiconductor optical amplifier changes rapidly as the input power changes and, as a result, the gain is not constant for the modulation speed of current communication systems. Thus, the gain of a semiconductor optical amplifier exhibits a nonlinear characteristic which causes the aforementioned problems of inter-modal distortion and cross-saturation which, in turn, can cause errors in the detection of bits transmitted within the channels of an optical communication system. Consequently, we have identified a need to solve the aforementioned problems so that semiconductor optical amplifiers can become a suitable alternative for single channel and WDM systems instead of the more expensive and bandwidth-limited erbium-doped fiber amplifiers.

According to the principles of the invention, we have discovered that semiconductor optical amplifiers can be effectively used as in-line amplifiers in wavelength division multiplexed systems even in the presence of inter-modal distortion and cross-saturation. More specifically, we have discovered that substantially error-free detection of bit patterns can be achieved in the presence of such distortion by selecting a detection threshold level that is optimally derived as a function of a maximum power level for a bit "0" and a minimum power level of a bit "1". For a WDM optical signal having N optical channels, the detection threshold level according to. one illustrative embodiment corresponds to the total output power of the amplified WDM signal divided by two times the number of optical channels in the amplified WDM signal.

Figure 3:
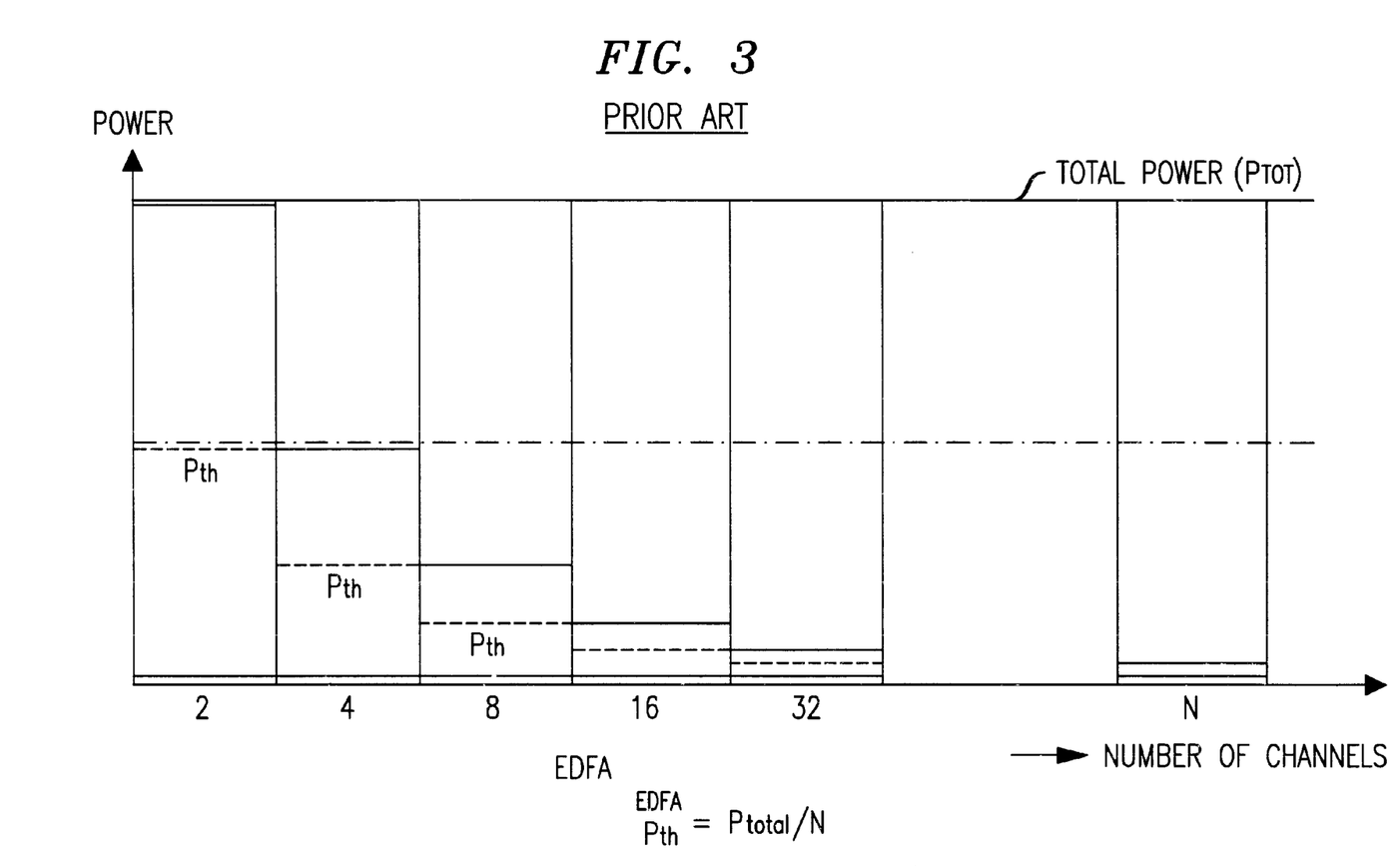
FIG. 3 is a graphical representation showing the distribution of power in individual channels of a typical WDM system employing erbium-doped fiber amplifiers and the associated power threshold for detection.
Figure 4:
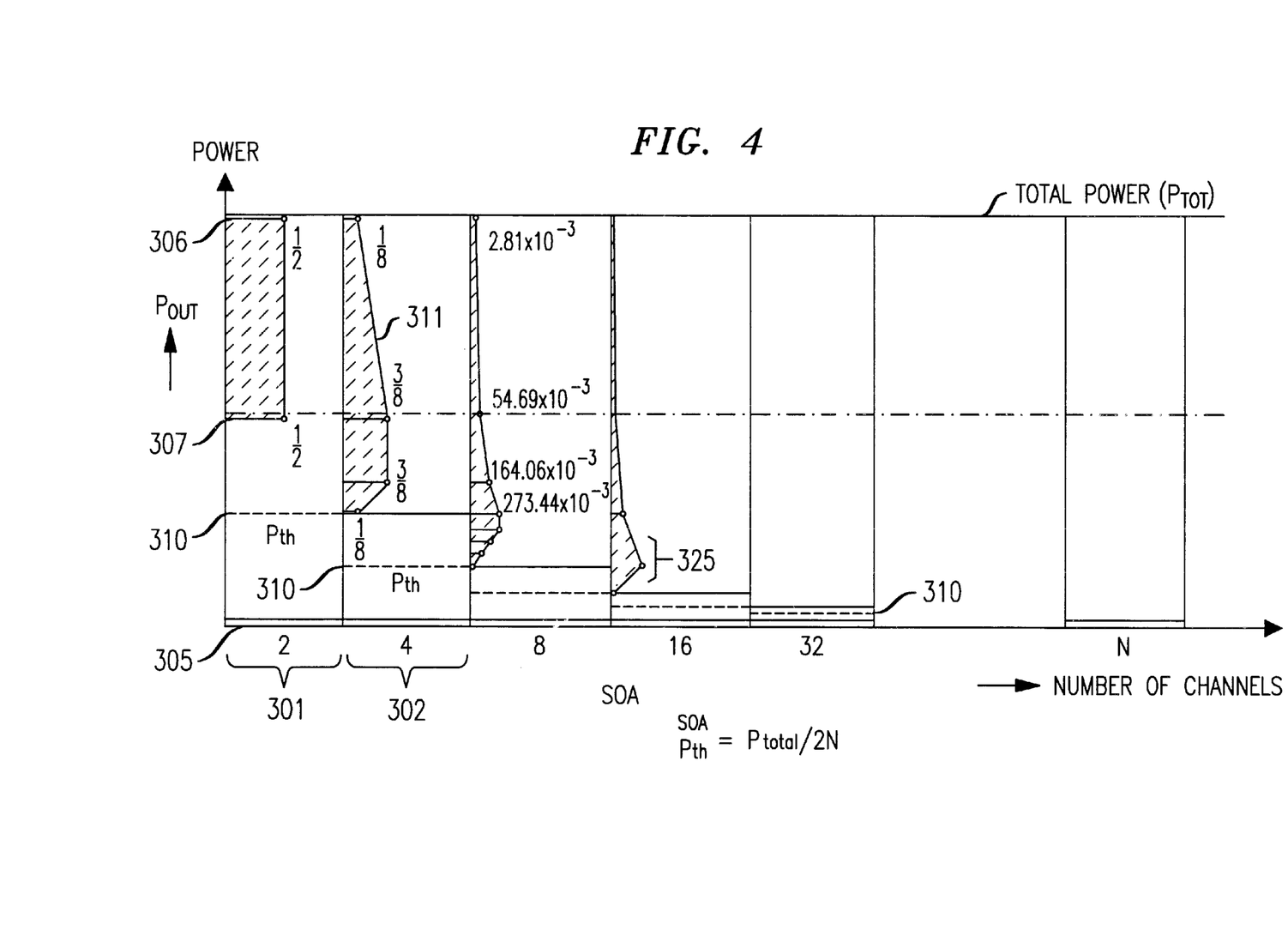
FIG. 4 is a graphical representation showing the distribution of power in individual channels of a WDM system employing semiconductor optical amplifiers and the associated power threshold for detection according to the principles of the invention.
Figure 5:
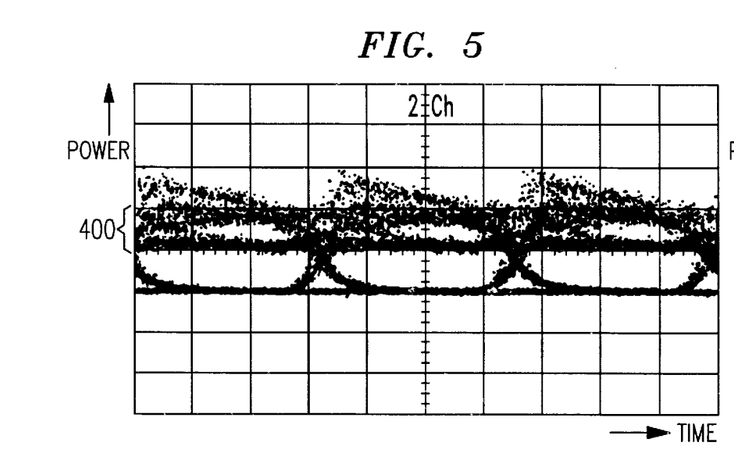
FIGS. 5–8 are graphical plots in the form of eye diagrams showing the distribution of power and the cross-saturation effects thereon for WDM systems having different exemplary channel counts according to the principles of the invention.
Figure 6:
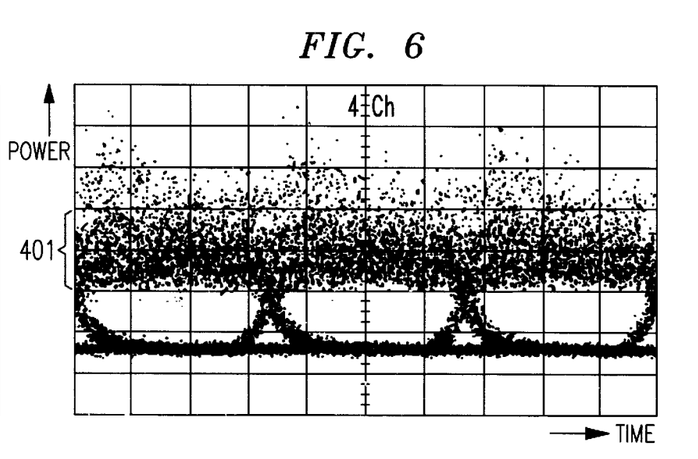

FIG. 3 shows how thresholds are typically assigned for erbium-doped fiber amplifier systems, which will provide a better understanding of how detection thresholds are selected for semiconductor optical amplifiers according to the principles of the invention shown in FIG. 4. In both cases, it is assumed that appropriate bit detection is carried out using thresholding techniques. We also assume for both examples that the amplifiers are strongly saturated as is typical in WDM systems, that the saturation power of all N channels is the same, and that there is an equal probability of "1"s and "0"s in the coding process. The total output power is represented as $P_{TOTAL}$. For purposes of these examples, noise from the transmitter and receiver is not considered. It should also be noted that FIGS. 3 and 4 show the distribution of output power as viewed from the perspective of only one of the channels in the system. Using FIG. 4 as an example, the distribution of output power PoUT for one of the 2 channels is shown in segment 301, the output power $P_{OUT}$ for one of the 4 channels is shown in segment 302, and so on.

As shown in FIG. 3 for an erbium-doped fiber amplifier that amplifies N channels in a WDM system, the linear performance causes each channel to take an equal share of the total output power, represented as $P_{TOTAL}/N$. Consequently, the threshold for detection can then be set at the average power of $P_{TOTAL}/N$, with some variation that may be dictated by other practical considerations. Given the linear gain characteristics of erbium doped fiber amplifiers, there will only be one possible value for the "1" bit.

By contrast and as shown in FIG. 4 for a semiconductor optical amplifier that amplifies N channels in a WDM system, the amplifier output power of any one of the channels will fluctuate with some probability distribution according to the modulation of the other channels because of the aforementioned cross saturation effects. In particular, for N channels, there will be N possible values for bit "1" in any given channel. For example, there will be two possible values for a bit "0" for a 2-channel system, four possible values for 4-channel system, and so on. Using the 2-channel representation 301 as an example, a bit "0" in the channel will have an output power level corresponding to level 305, while a bit "1" in the channel could have one of two values. Namely, when the other of the two channels has a bit "0", then a bit "1" in the channel shown in FIG. 4 will have an output power level 306 that is substantially equal to the total power, $P_{TOTAL}$ of the system. If the other of the two channels has a bit "1", then a bit "1" in the channel shown in FIG. 4 will have an output power level 307 equal to the total power, $P_{TOTAL}$ of the system divided by the number of channels, which is two in this case. As described, this distribution is a result of the sharing of power caused by cross-saturation effects.

Consequently, the maximum possible output power value for a bit "1" in a channel will be $P_{TOTAL}$ when all the other channels have a bit "0" simultaneously. Similarly, the minimum possible output power value for a bit "1" will always be $P_{TOTAL}/N$, when all the channels have a bit "1" simultaneously. The other intermediate output power values of a bit "1", e.g., output power level 315, will assume values within a probability distribution when there is a combination of "0"s and "1"s in the other channels. This case is clearly shown for the 4-channel power distribution (302) as well as the other exemplary power distributions in FIG. 4.

We have discovered that if the detection threshold 310 ($P_{TH}$) is set to be half of the lowest possible value ($P_{TOTAL}/N$), that is, $P_{TH}=P_{TOTAL}/2N$, then accurate detection, and thus error-free communications, can be achieved notwithstanding the cross-saturation effects and assuming that the detector apparatus has sufficient dynamic range. Using the 2-channel system 301 as an example where N=2, the detection threshold 310 ($P_{TH}$) would therefore be set at $¼^{th}$ of the total output power $P_{TOTAL}$. By comparing the detection thresholds in FIGS. 3 and 4, it becomes apparent that the detection threshold in a semiconductor optical amplifier-based system is therefore one half of that of an erbium-doped fiber amplifier-based system. As will be described in more detail below, it should be noted that the detection threshold level $P_{TH}$ may be adjusted to be approximately greater than or less than $P_{TOTAL}/2N$, depending on other system considerations.

According to another aspect of the invention, we have discovered that the effect of gain fluctuations becomes smaller as the number of channels increases thereby resulting in a smoothed total effective power effect. In particular, since the bit patterns in the channels of a WDM signal are pseudo-random and are independent of each other, the total power is smoother in a WDM system with multiple channels. This smoothed power effect can be seen in FIG. 4 where the distribution peak of output power levels for a bit "1" becomes more narrow and concentrated as the number of channels increases. For example, the distribution peak 325 for a 16-channel system is narrower than that of the systems having a lower number of channels. This smoothed total effective power reduces input power variation and, as a result, reduces the associated gain ripples. In fact, for an extremely large number of channels, the performance of a semiconductor optical amplifier will approach the linear performance of an erbium-doped fiber amplifier.

Figure 7:
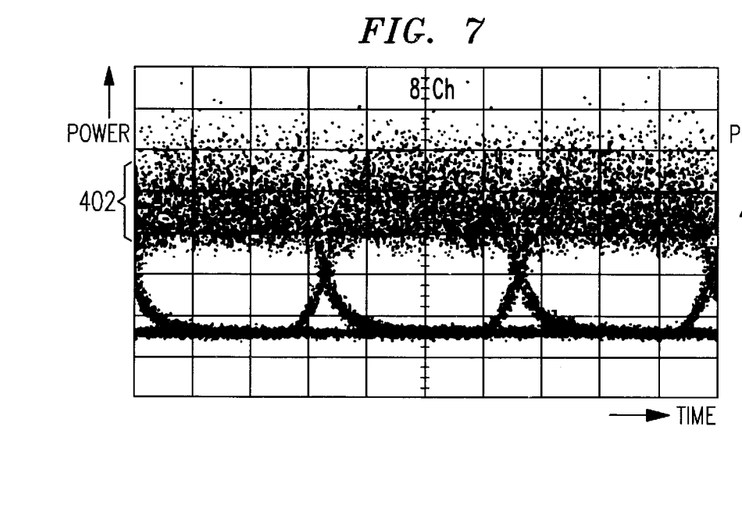
Figure 8:
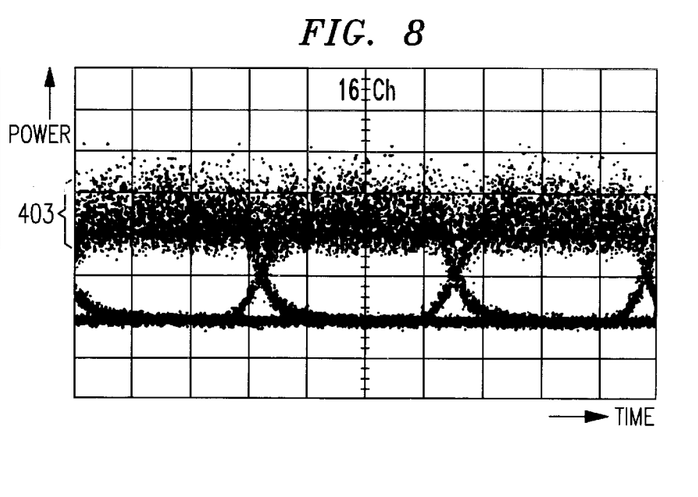
Figure 9:
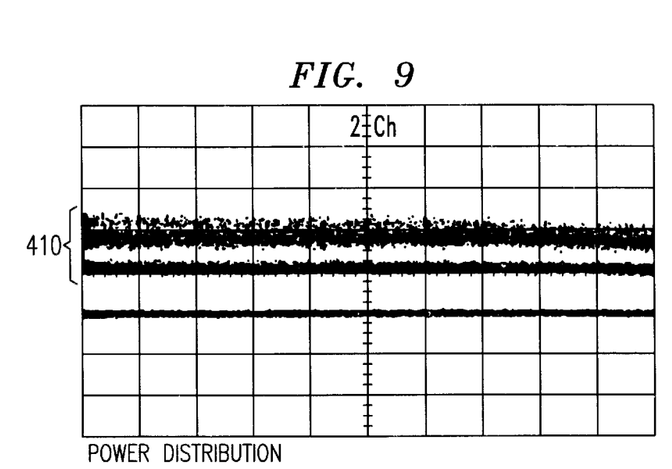
FIGS. 9–12 are graphical plots in the form of histograms further illustrating the distribution of power and the cross-saturation effects thereon for the corresponding examples shown in FIGS. 5–8.
Figure 10:
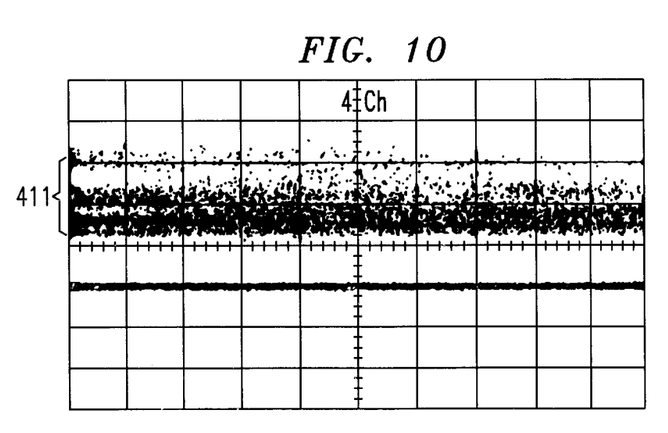
Figure 11:
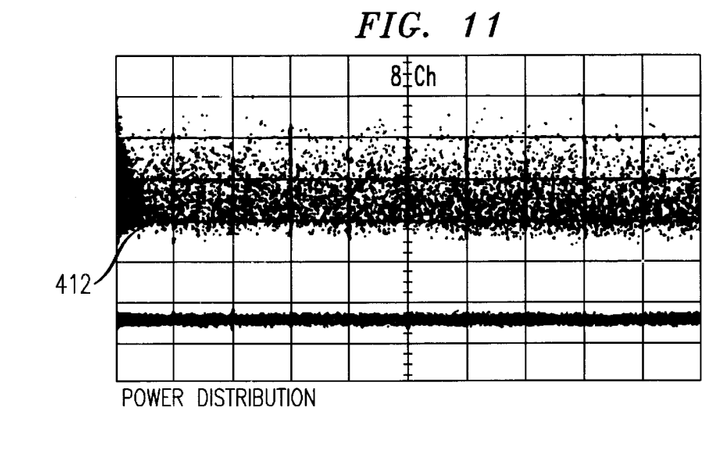
Figure 12:
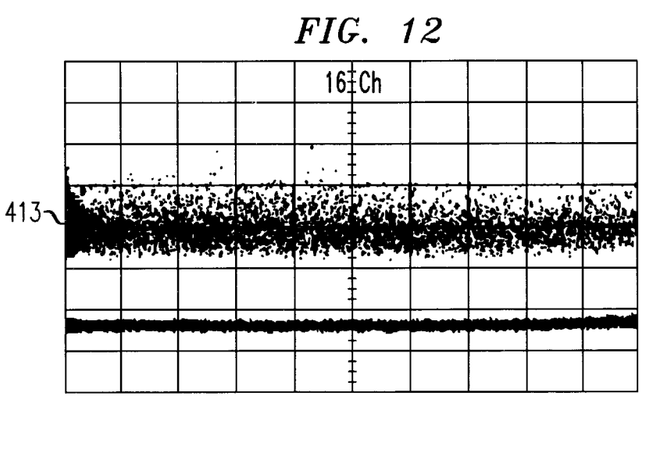

The power smoothing effect is also apparent in view of the eye diagrams in FIGS. 5–8 as well as in the histograms in FIGS. 9–12. FIGS. 5–8 show the distribution of power in only one of the channels to illustrate the cross-saturation effect from the other channels. As shown, FIGS. 5–8 illustrate how regions 400–403, which represent the output power distribution of a bit "1", become more defined (e.g., the distribution width of bit "1" reduces) while the eye opening becomes larger as the number of channels increases from 2 to 32 channels. In the 2-channel case shown in FIG. 5 for example, the bit "1" has two possible values. For the 4-channel case shown in FIG. 6, the bit "1" has four possible values, which are also blurred by noise. When the channel number is increased to 8 and 32 as shown in FIGS. 7 and 8, the bit "1" becomes more clearly defined and the eye opening becomes larger.

Similarly, the histograms in FIGS. 9–12 further illustrate the more defined and narrower distribution peaks 410–413 of the bit "1" output power distribution as the number of channels increases from 2 to 16 channels. It should be noted that, in practice, noise from the transmitter and receiver in a system may also contribute to the width of bit "1" and degrade bit-error-rate (BER) performance. Additionally, the linewidth of bit "1" can also be significantly increased due to nonlinear effects in transmission fiber.

In sum, as the number of WDM channels in optical communication systems continues to increase, semiconductor optical amplifiers used in accordance with the principles of the invention will therefore be able to provide smoother total effective saturation power with smaller gain variations. Furthermore, the power smoothing effect can be effectively used not only to design and control optical communication systems and networks, but the principles also apply to digital systems operating with more than two levels. The smoothed total effective power can also improve the performance of analog communication systems.

In the above discussions, the power in bit "1" is assumed to be a constant for all signal channels. When semiconductor optical amplifiers are cascaded in optical communication systems, the power in bit "1" is likely to become non-uniform after the first amplifier. For example, when amplifiers are cascaded, the dispersion in the transmission fiber can cause relative shifts in the bits of different signal channels. In particular, since transmission fiber does have finite dispersion, the bits in different channels travel at different speeds which causes the bits to shift relative to each other during transmission. As a result, the equivalent input power at a subsequent semiconductor optical amplifier in the cascaded chain may be higher or lower than the nominal input power. Consequently, the total input power to subsequent semiconductor optical amplifiers in the cascaded chain can fluctuate and cause further distortion. The inventive aspects described herein may be applied to address this problem, for example, by setting a lower detection threshold $P_{TH}$, i.e., a prescribed level below $P_{TOTAL}/2N$, to ensure accurate detection. Additionally, well known dispersion compensating techniques may also be used in conjunction with the invention to lessen the effects of dispersion in a fiber.

It should also be noted that in the above discussions, it was assumed that the semiconductor optical amplifier operates under strong saturation conditions. If the amplifier is operated under less saturation or even in the linear region, the distortion and crosstalk will be less. Accordingly, the detection threshold level PTH can also be adjusted as needed in these cases.

There are other parameters of semiconductor optical amplifiers that may need to be addressed in conjunction with the teachings of the invention depending on the particular application. For example, the noise figure for semiconductor optical amplifiers (e.g., typically 6 dB or higher) and the output power (e.g., typically 15 dBm or lower) may need to be addressed with other complementary techniques for long haul applications. Furthermore, other techniques may be used for addressing some of the other nonlinear effects of fiber-based systems, such as four-wave-mixing, self-phase-modulation, and cross-phase-modulation, to name a few. In sum, the principles of the invention address the saturation induced crosstalk effects which have prevented widespread use of semiconductor optical amplifiers in WDM applications. With these problems solved, the principles of the invention can therefore be readily applied to provide a low cost solution for WDM transmission, such as in metropolitan applications and the like.

The following example describes an experiment performed to demonstrate the principles of the invention described above. However, it should be noted that the various arrangements, devices, materials, dimensions, parameters, operating conditions, etc., are provided by way of illustration only and are not intended to limit the scope of the invention.

EXAMPLE

Figure 13:
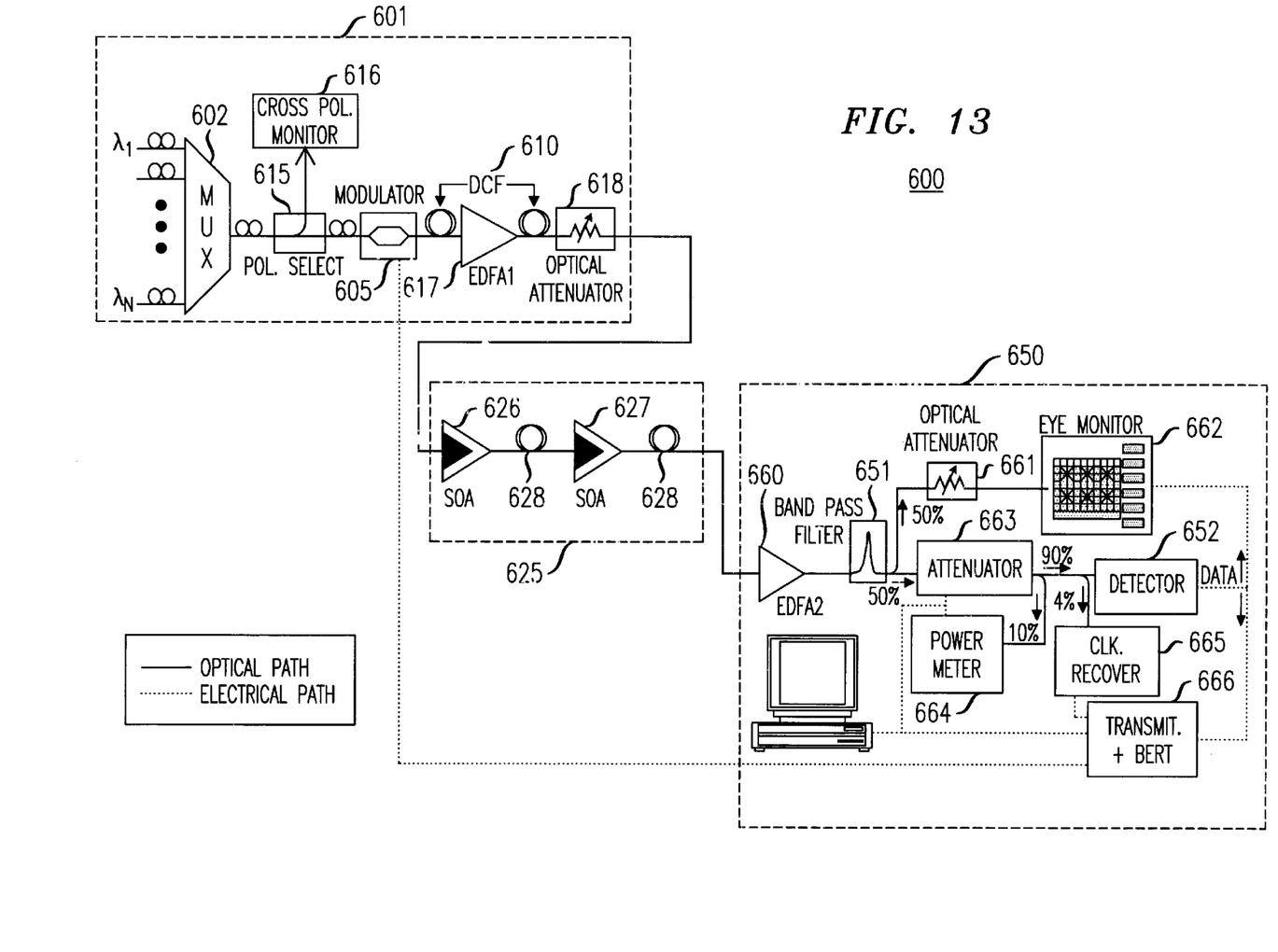
FIG. 13 is a simplified schematic showing an exemplary embodiment of a WDM system in which the principles of the invention may be applied.

An exemplary wavelength division multiplexed system 600, which can be used in conjunction with the principles of the invention, is shown in FIG. 13. For this example, system 600 included a transmitter portion 601, a transmission section 625, and a receiver portion 650. In transmitter portion 601, waveguide router (multiplexer) 602 was used to combine 32 signal channels (N=32) supplied by external cavity lasers (ECLs) (not shown) with wavelengths ranging from 1538 nm to 1562 nm with a channel spacing of 100 GHz. All channels were modulated with $LiNbO_3$ modulator 605 and subsequently decorated with two segments of dispersion compensating fiber (DCF) 610. The data rate was 2.5 Gb/s for each of the channels. Polarization selector 615, cross-polarization monitor 616, erbium doped fiber amplifier 617, and optical attenuator 618 were also used in transmitter portion 601 according to well-known techniques and principles of operation.

Transmission section 625 included two semiconductor optical amplifiers 626–627, each of which was coupled at its output to a 55 km segment of Lucent Technologies' True-Wave® optical fiber 628. Single stage semiconductor optical amplifiers without gain control were used for the experiment. For amplifiers 626–627, the input power was maintained at −5 dBm, the gain was 13 dB, and the output power was 8 dBm. Both amplifiers were strongly saturated. The pump current was 200 mA for both amplifiers 626–627.

At receiver portion 650, band-pass-filter 651 was used to select one channel at a time for appropriate measurement, e.g., BER and eye measurement. In particular, detector 652 was used to detect bits in the 32 channels using an optimum detection threshold level according to the principles of the invention. Other components in receiver portion 650 were used in accordance with well known principles of operation. For example, erbium-doped fiber amplifier 660 was used to provide appropriate pre-amplification. Optical attenuator 661 and eye monitor 662 were used to facilitate the measurement of the incoming signal patterns. Attenuator 663, power meter 664, clock recovery circuit 665, and bit error rate tester 666 were used to facilitate the measurement of power and bit error rate in the received signals.

Figure 14:
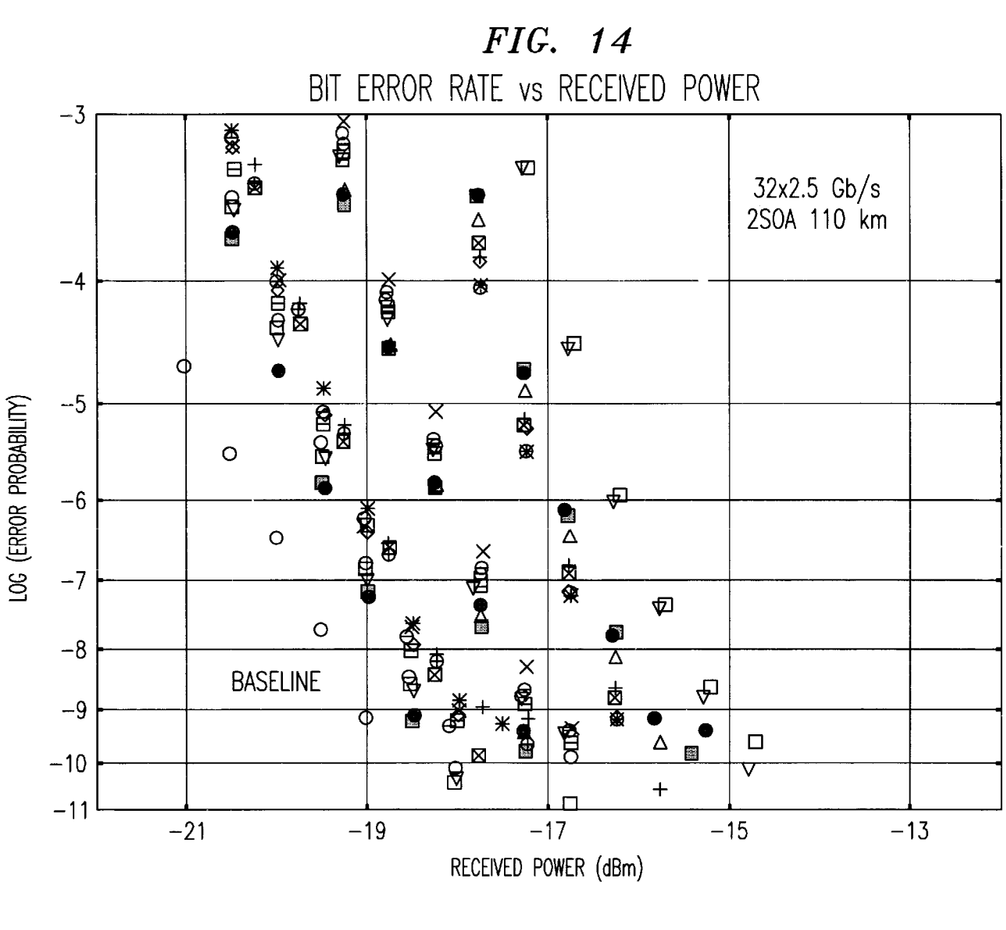
FIG. 14 shows bit error rate measurements corresponding to an experimental demonstration of the principles of the invention using the system configuration of FIG. 13.

By setting the appropriate detection threshold level $P_{TH}$ according to the principles of the invention, substantially error-free transmissions were observed. The BER measurement data for all 32 channels transmitted in the exemplary configuration in FIG. 13 are shown in FIG. 14. As shown, error-free transmissions on the order of $10^{-9}$ were achieved for all 32 channels.

The foregoing is merely illustrative of the principles of the invention. Those skilled in the art will be able to devise numerous arrangements, which, although not explicitly shown or described herein, nevertheless embody principles that are within the spirit and scope of the invention. For example, although many of the embodiments shown and described herein were directed toward in-line amplifier applications, the principles of the invention can also be applied in applications where optical amplifiers are used as power amplifiers after transmitters or as pre-amplifiers before receivers in either single channel optical communication systems or wavelength division multiplexed systems. Furthermore, the inventive principles described herein are applicable for semiconductor optical amplifiers as well as any type of optical amplifier in which the gain dynamics may give rise to the aforementioned problems solved by the invention. Accordingly, the scope of the invention is limited only by the claims that follow.

We claim:

1. A wavelength division multiplexed (WDM) optical communication system including at least one optical amplifier for amplifying a WDM optical signal having a plurality of optical channels of respective wavelengths, each of the plurality of optical channels capable of being modulated to trait information as bits, the system comprising:

for each optical channel, a detector adapted for detecting bits transmitted in the optical channel, in the presence of distortion caused by gain variations, according to a detection threshold level that is approximately equal to the total output power of the amplified WDM optical signal divided by two times the number of optical channels in the amplified WDM optical signal.

2. The system according to claim 1, wherein the at least one optical amplifier comprises a semiconductor optical amplifier.

3. The system according to claim 1, wherein each of the plurality of optical channels is capable of being intensity modulated for transmitting bits of digital data.

4. The system according to claim 3, wherein a power level in one of the plurality of optical channels varies as a function of both intensity modulation in that channel and intensity modulation in other ones of the plurality of optical channels, and wherein variations are representative of saturation induced crosstalk.

5. The system according to claim 3, wherein a power level in one of the plurality of optical channels varies as a function of intensity modulation in that channel, and wherein variations are representative of inter-modal distortion.

6. A method for detecting bits transmitted in a wavelength division multiplexed (WDM) optical communication system comprising at least one optical amplifier for amplifying a WDM optical signal having a plurality of optical channels of respective wavelengths, each of the plurality of optical channels capable of being modulated to transmit information as bits, the method comprising:

in the presence of distortion caused by gain variations, detecting bits in each optical channel using a detection threshold level that is approximately equal to the total output power of the amplified WDM optical signal divided by two times the number of optical channels in the anplified WDM optical signal.

7. The method according to claim 6, wherein the at least one optical amplifier comprises a semiconductor optical amplifier.

8. The method according to claim 6, wherein each of the plurality of optical channels is capable of being intensity modulated for transmitting bits of digital data.

9. The method according to claim 8, wherein a power level in one of the plurality of optical channels varies as a function of both intensity modulation in that channel and intensity modulation in other ones of the plurality of optical channels, and wherein variations are representative of saturation induced crosstalk.

10. The method according to claim 8, wherein a power level in one of the plurality of optical channels varies as a function of intensity modulation in tat channel, and wherein the variations are representative of inter-modal distortion.

* * * * *